(No Model.) 4 Sheets—Sheet 1.
L. GUTMANN.
ELECTRIC CONVERTER.
No. 484,959. Patented Oct. 25, 1892.
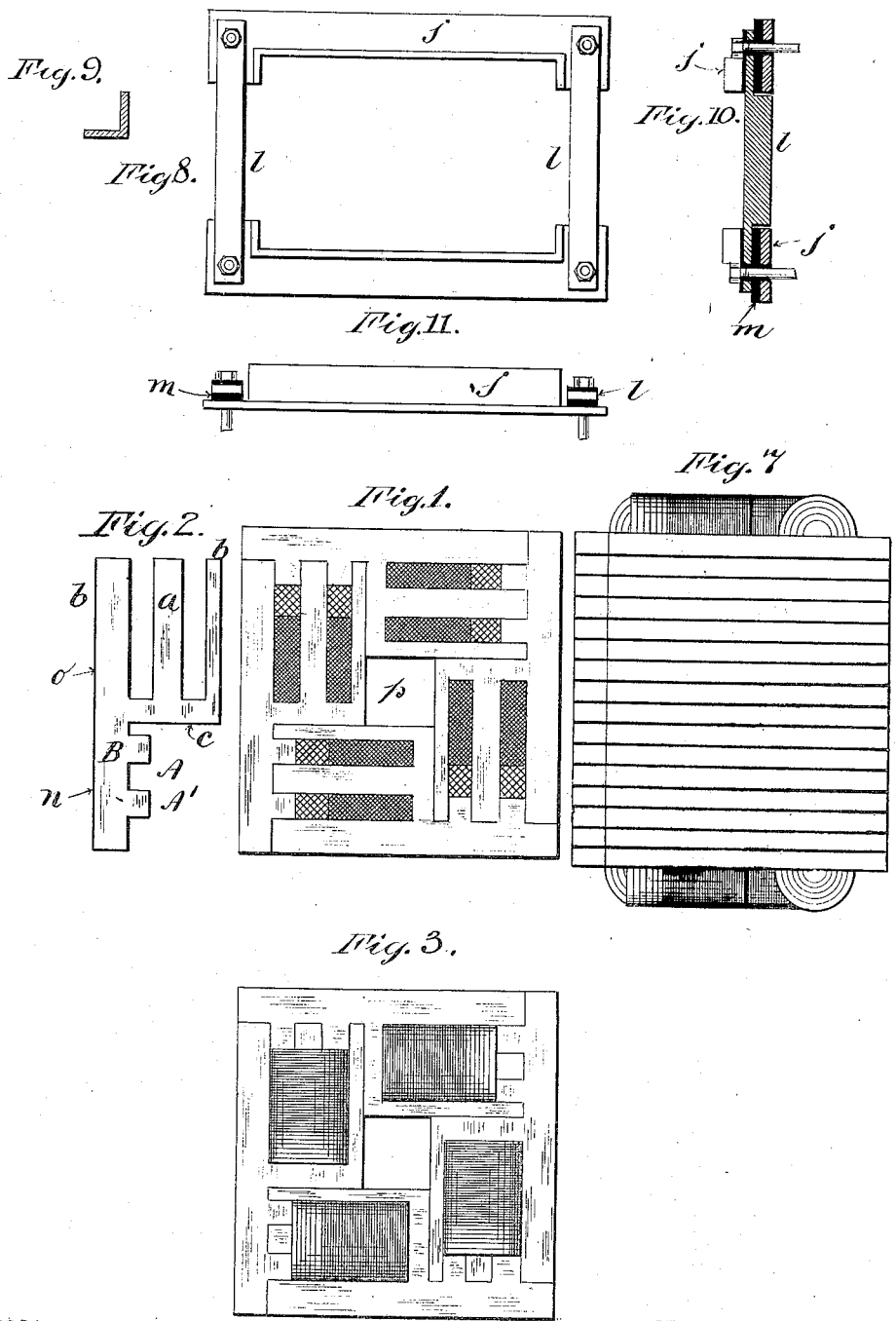
Witnesses:
Inventor:
Ludwig Gutmann,
By his Attorney,
Edward P. Thompson (No Model.) 4 Sheets—Sheet 2.
L. GUTMANN.
ELECTRIC CONVERTER.
No. 484,959. Patented Oct. 25, 1892.
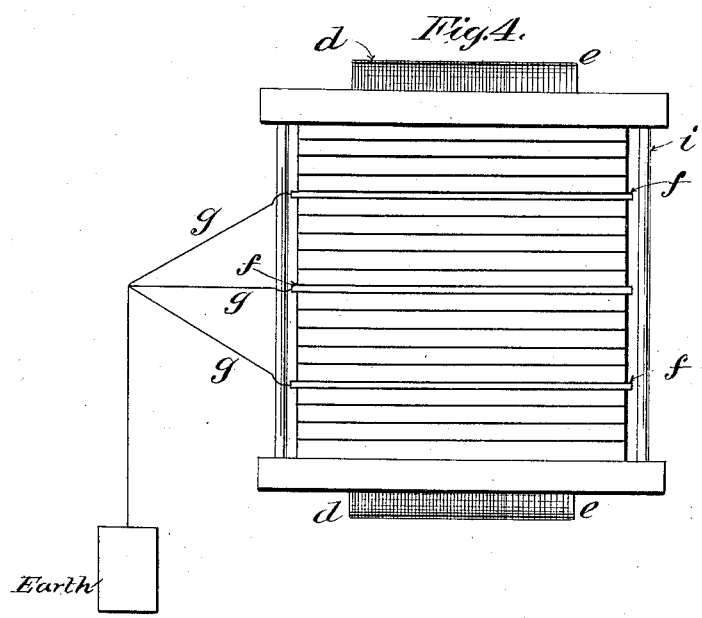
Fig.4.
Earth
Fig.6.
Fig.5.
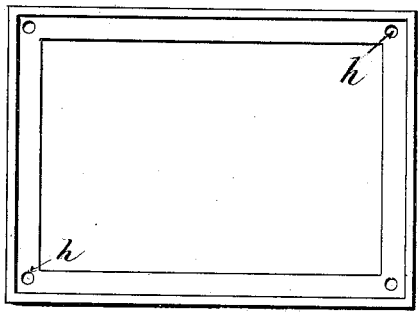
Witnesses:
D. W. Gardner
G. T. Miatt
Inventor:
Ludwig Gutmann
By his Attorney
Edward P. Thompson (No Model.) 4 Sheets—Sheet 3.
L. GUTMANN.
ELECTRIC CONVERTER.
No. 484,959. Patented Oct. 25, 1892.
Fig. 14.
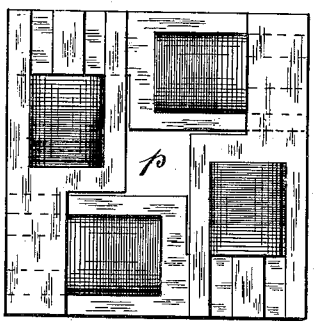
Fig. 12.
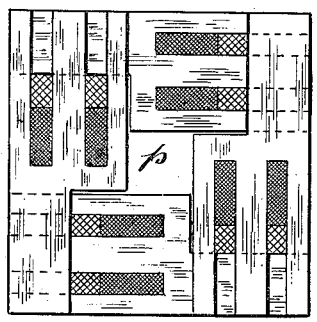
Fig. 13.
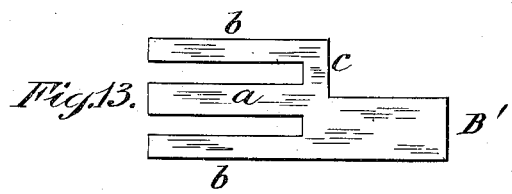
Fig. 15.
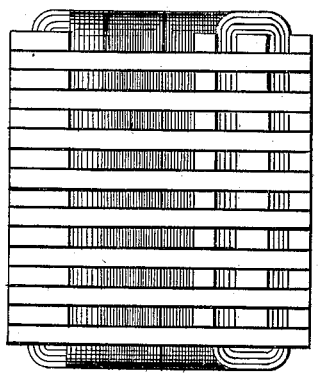
Witnesses:
Inventor
Ludwig Gutmann
By his Attorney,
Edward P. Thompson.

(No Model.) 4 Sheets—Sheet 4.

L. GUTMANN.
ELECTRIC CONVERTER.

No. 484,959. Patented Oct. 25, 1892.

Witnesses:
D. W. Gardner
G. J. Miatt

Inventor:
Ludwig Gutmann,
By his Attorney,
Edward P. Thompson

UNITED STATES PATENT OFFICE.

LUDWIG GUTMANN, OF FORT WAYNE, INDIANA.

ELECTRIC CONVERTER.

SPECIFICATION forming part of Letters Patent No. 484,959, dated October 25, 1892.

Application filed February 5, 1889. Serial No. 298,719. (No model.)

*To all whom it may concern:*

Be it known that I, LUDWIG GUTMANN, a subject of the German Emperor, and a resident of Fort Wayne, in the county of Allen and State of Indiana, have invented certain new and useful Improvements in Electric Converters, (Case No. 18,) of which the following is a specification.

My present invention relates to a battery-converter cheap and convenient to manufacture and capable of quick modification as regards capacity or circuit connections. Its general features are such as to be more efficient and safer in operation when supplied by currents of dangerously-high pressure.

The object of the invention is to provide a converter whose capacity is changeable in wide limits as regards electro-motive force or currents, and at the same time of high electrical efficiency.

The invention is described by reference to the accompanying drawings, in which—

Figure 16:
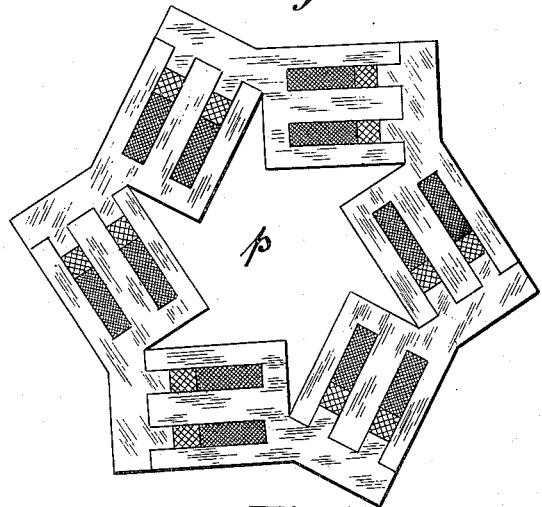
Figure 17:
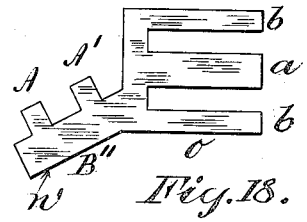
Figure 18:
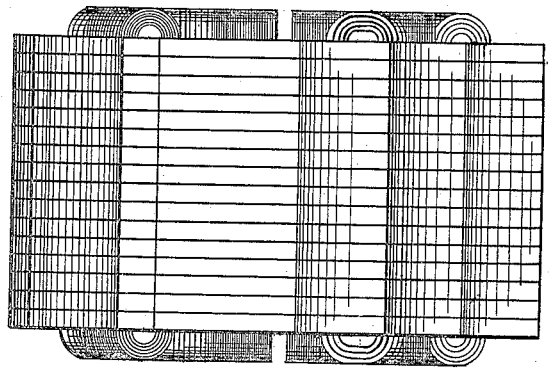

Figure 1 is a top view of a battery-converter having the upper ends of the coils cut off, which are shown in section. Figs. 2, 13, and 17 show element-plates for constructing the cores of said battery-converter. Fig. 3 is a top view of the converter with the coils uncut. Fig. 4 is an enlarged view of one set of coils and core, of which four are shown in Fig. 1. Fig. 5 is a clamping-frame applied at the top and bottom of the converter. Fig. 6 is a section at right angles to the plane of said frame. Fig. 7 is a side view of Fig. 3. Fig. 8 is a modified frame over Fig. 5. Figs. 9 and 10 are sectional views of the frame, Fig. 8, while Fig. 11 is an end view. Figs. 12, 14, and 15 are similar views to Figs. 1, 3, and 7, giving complete sectional view and one in elevation of a modification over Figs. 1 and 2. Figs. 16 and 18 are further modifications over Figs. 1 and 2, the former being a top view with the coils in section, while the latter is a view in elevation of the complete battery-converter.

Referring to the construction in general, it consists of primary and secondary winding subdivided into a number of coils for the purpose of reducing the number of layers superposed one on top of the other, thereby further reducing the length of wire required for such coils, as all or most of them are placed in most favorable position. The core-sheets are composed of element-plates to form complete or partially-complete magnetic circuits.

Referring to Fig. 1, it will be noticed that this battery-converter consists of four primary and four secondary coils with eight paths for the magnetic lines of force. The coils are arranged in pairs of one primary and one secondary, located so that the lines of force induced by the one coil should also pass the second coil of the pair. The core element consists of an angle-piece having arms $c$ B, Fig. 2, each arm of which, $c$ as well as B, is provided with extensions at right angles to the arm. Those starting from arm $c$ are marked $b\,a\,b$. Those starting from arm B are marked A and A'. The recesses formed by the extensions $b\,a\,b$ are partially filled by the primary and secondary coils, while the remaining space is used by the extensions A A' of the neighboring element-plate, which is adapted to partly or completely close the magnetic path. The figure shows four pairs of coils, which evidently may be used each separately from one another or in series, multiple series, or parallel connection. In Fig. 1 the tops of the coils are shown as removed or cut off, so that the opening through which they pass may become visible. The coils are wound and finished independently of each other and the core and then applied to the unfinished or partially-mounted core.

Fig. 3 is a top view of Fig. 1, which shows the four sets of coils in position unembedded in a core, which may form two, four, or eight magnetic circuits, depending upon the connection of the coils.

Fig. 4 shows a single element-converter on a larger scale and a modified construction of the core. The core shown here consists of two sets of plates of the core proper and a number of plates $f$, insulated from the adjacent plates and projecting over them for admitting of metallic and electric connections from one plate to another. The plates may be of any suitable conductor—for instance, iron or copper. The main purpose of this double core is to provide a transformer system either perfectly safe or inoperative. The plates connected to one another and to the ground may act as a condenser in connection with the other plates when connected with one terminal or either primary or secondary coils. It is intended to increase a strain on the insulation, especially in case of defective insulation of one of the primary coils, of which a turn or layer may come in contact with one or more of the core-plates, which would connect the winding and current with earth by direct connection, or indirectly by first starting a condenser action between the core parts in contact with winding and those or that connected to ground, the pressure superposed upon the apparatus by the so-formed condenser, which at first is of extremely-small capacity, would hasten the destruction of the fuse in circuit or else would penetrate the first insulation between insulated core-plates, thereby connecting the primary current to ground, and thereby causing the melting of the fuse. In Fig. 4 three such plates are shown separated from one another by the other plates and connected to one another by wires $g$. It is self-evident that the number of plates electrically connected to one another may be reduced to two; but a single plate may be adopted if provisions are made for the attachment of a ground-wire. Further, that the number of sets of poles connected with one another may be multiplied. The one set of plates $f$ are shown connected to earth.

In order to maintain the plates in an accurate and constant position in relation to one another, I provide a frame of cast-iron, brass, or other suitable metal for each element-converter, or else one for the whole battery-converter applied on top and bottom. Such a frame is shown in Fig. 5. It is provided with holes $h$ in each corner, through which pass bolts I to clamp together the plates of the converter. The cross-section of the frame is rectangular and shown in Fig. 6.

Fig. 7 represents an elevation of the complete converter, Fig. 1, of which the core and two sets of coils are visible.

Fig. 8 is a view of a modified frame, which is constructed in sections. Fig. 9 shows the L shape cross-section of the same. Fig. 10 shows a cross-section of one side of said frame. Two flanged metallic pieces $l$ are joined together by the other pieces or strips $j$ to form a rectangular frame. In order to separate the upper frame from the lower one, an insulating material $m$ is introduced between the bolts and the frames. Fig. 11 is another view of said frame, showing the strips of each frame insulated from one another by insulation $m$. Fig. 12 is a similar view to Fig. 1, and so is Fig. 14. The difference lies in the core construction, which is shown in Fig. 13, and the difference is clearly visible in Fig. 15. In Fig. 13 the element-plate differs from that shown in Fig. 2, inasmuch as the one angle-arm B′ has no recess cut in it, so as to form projections A A′, as in Fig. 2. The consequence is that the magnetic circuit is not completed in one layer, but in two. This is shown in Fig. 15, in which the thickness of the plates is exaggerated. The core is built up by placing the projections $a$ in the central opening of the coils and completely or partially closing the magnetic circuit by placing the angle-arm B′ of one element above the three projections $b\,a\,b$ of the element below. The magnetic circuit of two adjacent layers is completely closed if there is no insulation between them and only partially closed if separated by silk or blotting-paper unvarnished or any other preferable fibrous material, as this material would cause a small air-gap. In case that the core should be made to form completely-closed magnetic circuits, which, as experiments disclose, decrease rapidly in efficiency with increased and high alternations, it would be evident that always two superposed layers would form one set of closed circuits, which ought to be carefully insulated by fibrous insulation from the neighboring sets. It will be noticed, further, that this combination will not only increase the radiating-surface of the core, but allows coil portions to be directly in contact with the air.

Figs. 16, 17, and 18 are modifications over Figs. 1, 2, and 3. In this battery-converter there are six element-converters, and to mount them with a single core common to all it is necessary to change the angle in the core element. This is clearly shown in Fig. 17, which only in this point differs from Fig. 2. In properly designing an element-plate it is self-evident that uniform cross-section should prevail, and for that reason the projection $a$ is shown twice as wide as those at $b$, as the central part carries twice the number of lines of force. In this battery-converter all the elements for completing one set of magnetic circuits are arranged to lie in one and the same plane, and consequently no air will be circulating between the plates. To increase now surface radiation of the core, the central pole $p$ has been enlarged considerably. Fig. 18 shows this battery-converter in elevation, which is especially adapted for railroad-work, central-station regulation, sub-station supplies, &c., for places where the supply varies between wide limits.

I claim as my invention—

1. In an electric converter, the combination, with energizing-coils, of a core composed of superposed insulated plates and a conductor connecting electrically plates separated from one another by others.

2. In an electric converter, the combination, with primary and secondary coils, of a core composed of superposed metallic plates separated by insulation, one or more conductors connecting electrically plates separated from one another by others.

3. In an electric converter, the combination, with primary and secondary coils, of a core composed of superposed plates, one or more conductors connecting electrically plates separated and insulated from one another by others, and means for connecting one or more of said sets of connected plates to ground.

4. In a magnetic core for electric converters or generators, the combination of plates provided with perforations or recesses and extensions providing means for an electric connection.

5. In a system of distribution, the combination, with a suitable source of electricity, of a converter having one or more primary coils in circuit therewith, one or more secondary coils in circuit with translating devices, and a core for said converter some of whose plates are electrically connected with one another.

6. In a system of electrical distribution and in combination with a suitable source of alternating, pulsating, or intermittent electric currents, a converter having the energizing coil or coils connected with said source, the secondary coil in circuit with translating devices, and a core having some of its plates connected electrically to one another and to ground.

7. In an electric converter, the combination, with primary and secondary conductors, of a core divided into two or more sets of plates, a plate of one set placed alternately with one or more plates of another set, and electric conductors connecting electrically the plates of one set or more.

8. In an electric converter, the combination, with primary and secondary coils, of a subdivided core whose laminæ are insulated from one another and an electric conductor connected to some of said laminæ.

9. In an electric converter, the combination, with primary and secondary energizing-coils, of a laminated core common to both and one or more conductors connecting alternate plates with one another.

10. In an electric converter, the combination, with primary and secondary energizing-coils, of a laminated core common to both and one or more conductors each connecting two or more plates separated from one another by other plates and insulated from the latter.

11. In a system of distribution, the combination, with a suitable source of electricity, of one or more converters having each one or more primary coils in circuit with said source, one or more secondary coils in circuit with translating devices, and a laminated core, some of whose elements are electrically connected with one another.

12. In a system of distribution and in combination with a suitable source of electricity, an electro-magnetic translating device having a laminated core and one or more windings, one of the latter in circuit with said source, and an electric conductor connecting two or more laminæ insulated from others and surrounded by said windings to one another.

13. In a system of distribution and in combination with a suitable source of electricity, an electro-magnetic translating device having a laminated core and one or more windings, one of the latter being in circuit with said source, and an electric conductor connecting two or more laminæ insulated from others and surrounded by said winding to one another and to ground.

14. In an electric converter, a core therefor consisting of a plate or shank $c$, having three projections $b\ a\ b$ in one direction from the shank and one projection from the same shank in a different direction from that of the said three projections.

15. In an electric converter, the combination of primary and secondary coils and a core consisting of plates of iron, each plate having the combination of a shank provided with three projections, and a fourth projection which itself has two extensions $A$ and $A'$, both pointing in the same direction.

16. In an electric converter, a core consisting of the combination of plates formed in layers and the layers superposed, each layer having two or more plates, three of the projections of one plate overlapping the end of one projection of another, and electric coils, primary and secondary, inserted in the spaces between the projections.

17. In an electric-converter system, the combination of primary and secondary windings, a core for said windings, one or more ground plates or terminals located in said converter and insulated from the high-tension winding, a second earth plate or terminal located externally of said converter, making contact with the earth, and a conductor connecting the inclosed ground-terminal with the external earth-terminal.

18. In an electro-magnetic device, the combination, with a winding or windings, of a subdivided core, a ground-terminal, and an electric conductor connected electrically to one or more core laminæ and to said ground-terminal.

19. In an electric converter, a core composed of superposed plates and one or more interposed plates of metal of good conducting material between the said plates and connected to ground.

20. An electric converter consisting of separated plates of iron arranged around a common center, coils passing through said plates, the axes of two of the coils being parallel to each other and at an angle to the axes of the remaining coils and all the plates of one layer lying in the same plane.

In testimony that I claim the foregoing as my invention I have signed my name, in presence of two witnesses, this 17th day of January, 1889.

LUDWIG GUTMANN.

Witnesses:
MICHIAL RYAN,
WILLIAM C. RYAN.